(12) United States Patent
Luscombe et al.

(10) Patent No.: US 6,211,964 B1
(45) Date of Patent: Apr. 3, 2001

(54) METHOD AND STRUCTURE FOR INCORPORATING FIBER OPTIC ACOUSTIC SENSORS IN A SEISMIC ARRAY

(75) Inventors: John Luscombe, Sugarland; John L. Maida, Jr., Houston, both of TX (US); Malcolm Paul Varnham; Erhard Lothar Edgar Kluth, both of Alresford (GB); Sam Bull, Houston, TX (US)

(73) Assignee: GeoSensor Corporation, Houston, TX (US)

( * ) Notice: Subject to any disclaimer, the term of this patent is extended or adjusted under 35 U.S.C. 154(b) by 0 days.

(21) Appl. No.: 09/344,098

(22) Filed: Jun. 25, 1999

Related U.S. Application Data

(63) Continuation-in-part of application No. 09/169,252, filed on Oct. 9, 1998.

(30) Foreign Application Priority Data

Oct. 9, 1997 (GB) .................................................. 9721473

(51) Int. Cl.$^7$ ...................................................... G01B 9/02
(52) U.S. Cl. ...................... 356/477; 385/12; 250/227.27; 356/478
(58) Field of Search .................................. 356/345, 35.5, 356/477, 478; 250/227.19, 227.27; 385/12, 103, 104, 108

(56) References Cited

U.S. PATENT DOCUMENTS 4,076,382 * 2/1978 Oestreich .............................. 385/108

FOREIGN PATENT DOCUMENTS

2145237A * 3/1985 (GB).
2310280A * 8/1997 (GB).
2311131A * 9/1997 (GB).

* cited by examiner

Primary Examiner—Samuel A. Turner
(74) Attorney, Agent, or Firm—Felsman, Bradley, Vaden, Gunter & Dillon, L.L.P.

(57) ABSTRACT

A structure for incorporating fiber optic acoustic sensor in a seismic array includes means for supporting the sensor in a spiral around a central strength member in a manner to isolate shear waves from the sensor. In another aspect, an axially oriented sensor in a seismic array comprises a pressure sensitive optical fiber wound in a spiral around the axis, the fiber having a plurality of optical Bragg gratings and a plurality of channels. The preferred structure may include four tubes spiraling around the strength member. One of the tubes encloses an optical fiber sensor which is maintained in an extended orientation by fluid flow through the tube. Another of the tubes serves as a return path for fluid through the sensor tube. The other tubes enclose high speed and low speed data conductors, respectively. The sensor fiber may also be wound in a spiral around a compliant core in a manner to satisfy Poisson's Ratio such that strain on the compliant core does not alter the tension of the sensor fiber.

32 Claims, 6 Drawing Sheets

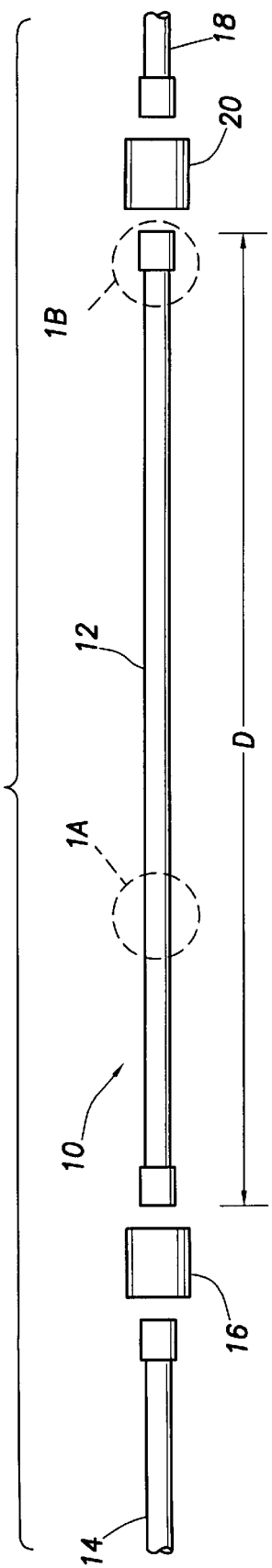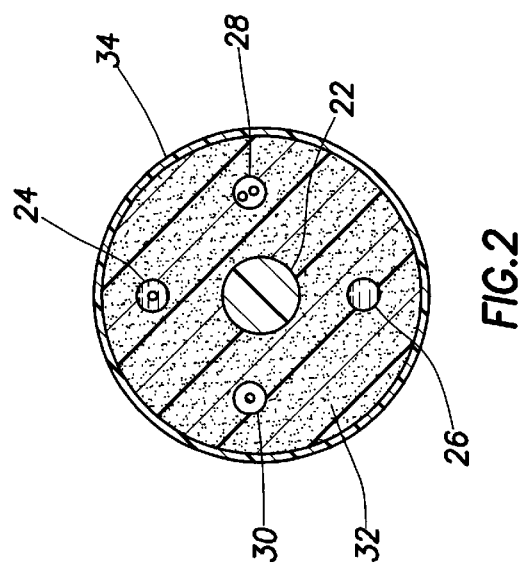

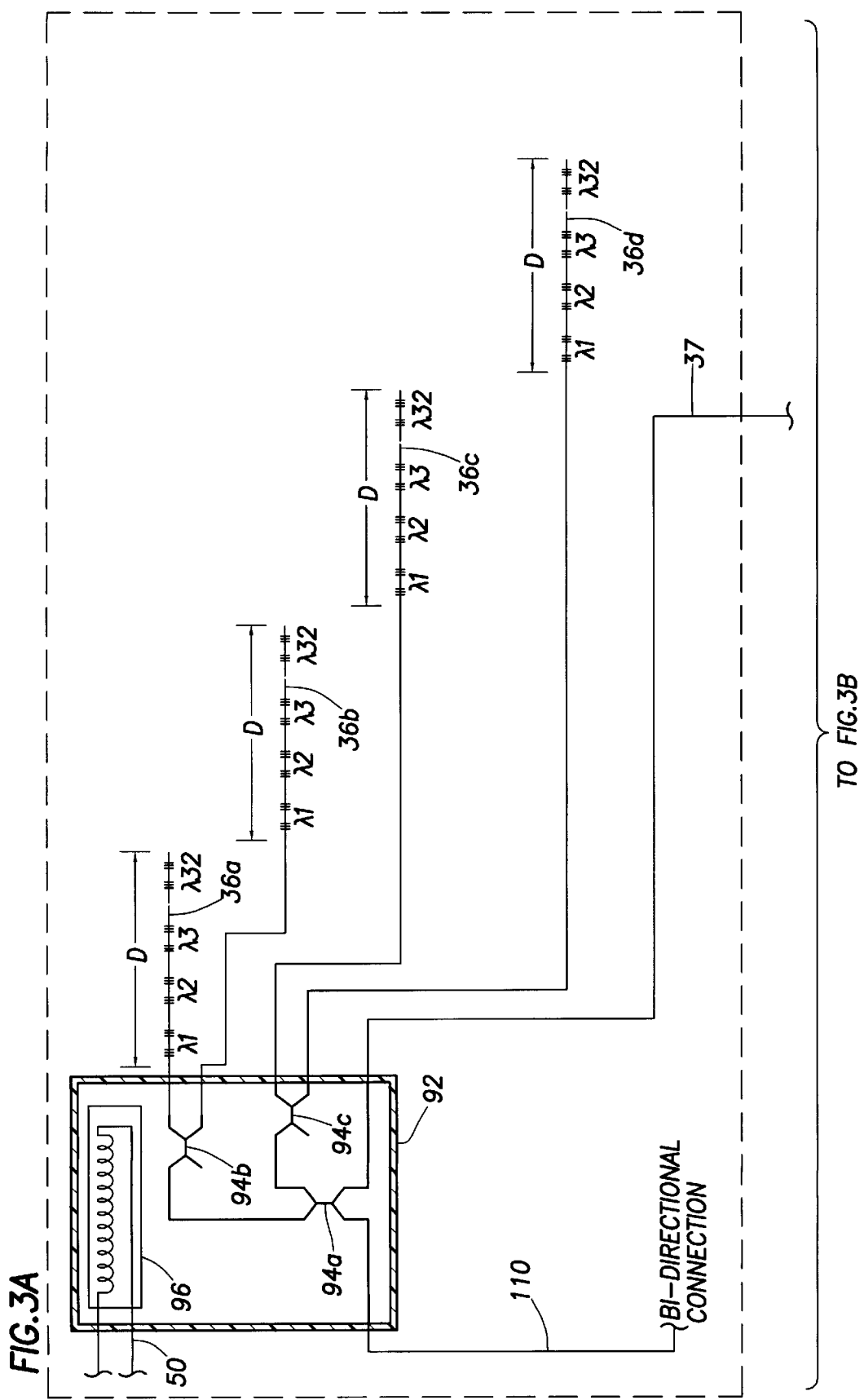

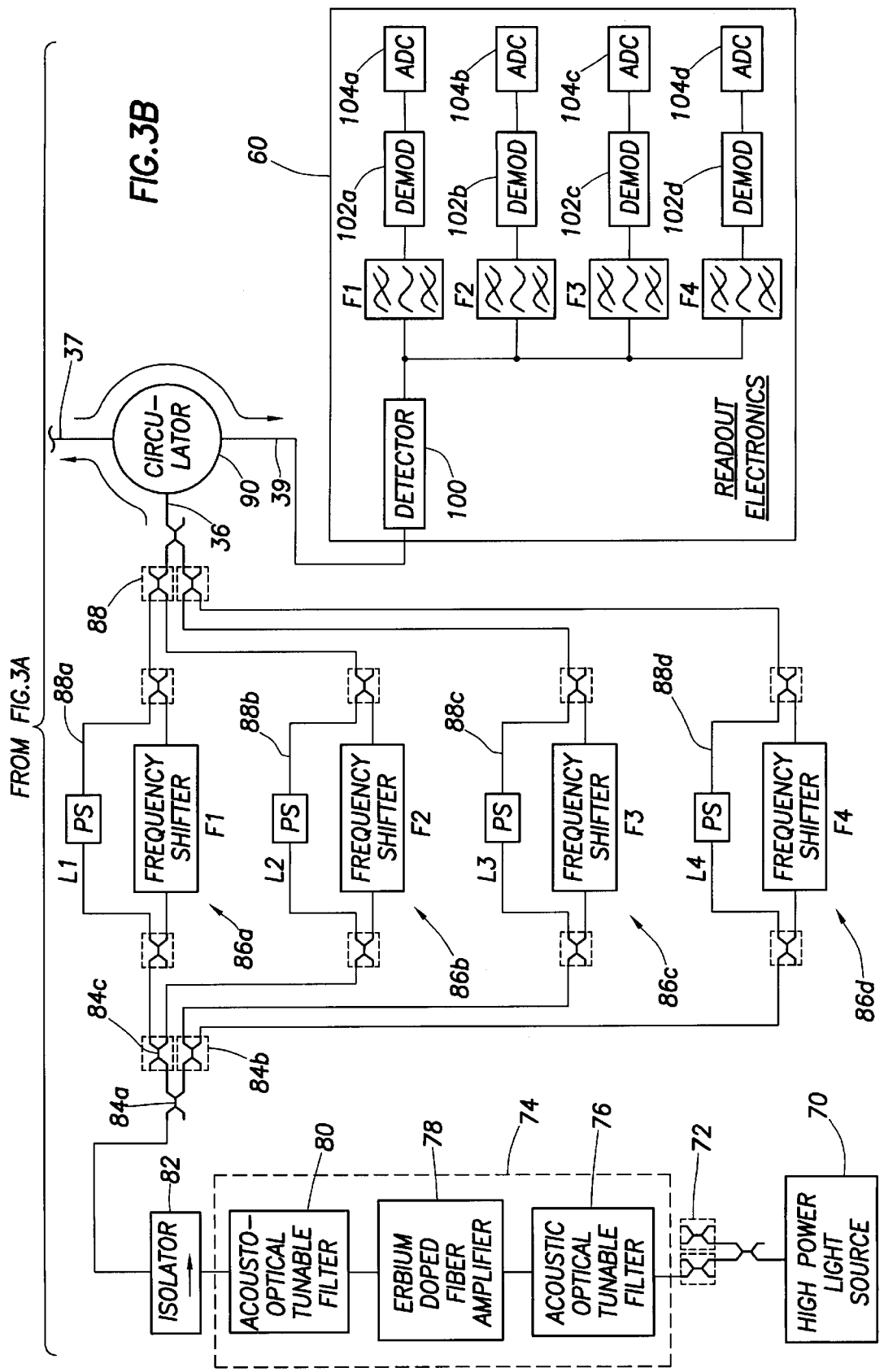

METHOD AND STRUCTURE FOR INCORPORATING FIBER OPTIC ACOUSTIC SENSORS IN A SEISMIC ARRAY

This is a continuation-in-part of co-pending U.S. application Ser. No. 09/169,252, filed Oct. 9, 1998, which claims priority from British Application No. 9721473.8, filed Oct. 9, 1997.

FIELD OF THE INVENTION

The present invention relates generally to the field of seismic exploration and more particularly, to a method and a structure for incorporating fiber optic acoustic sensors in a seismic array.

BACKGROUND OF THE INVENTION

Marine seismic exploration operations commonly include towing a seismic streamer behind a vessel. The seismic streamer includes data communications channels, power conductors, one or more strength members, and a number of sound-sensitive hydrophones or other sensors.

As the streamer is towed through the water during seismic operations, its primary function is to receive seismic signals at the sensors from subsurface geological structures, convert these seismic or acoustic signals to voltage signals, and transmit these voltage signals to a central receiver on board the vessel. Commonly, a number of hydrophones are coupled together as a group, and the group of hydrophones is coupled to a conductor within the streamer at a takeout.

The hydrophones so coupled together receive the seismic signals and provide a weighted average of the signal received by the hydrophones in the group. This weighted average is provided in analog form to a conductor within the streamer. This signal is digitized and recorded for later display of the subsurface geological structures.

The sensors are designed for extreme sensitivity because the seismic signals are well attenuated by the time they reach the sensors. Unfortunately, the sensors are equally sensitive to all kinds of noise, both from the cable itself and external to the cable. For example, as the cable is towed through the water, the cable is subject to sudden sharp movements and other mechanical perturbations which are conducted through strength members through the cable. Any such noise may be conducted to a sensor, and is thus detected as a signal or can mask the actual seismic signal.

Linear fiber optic hydrophones are based on the phenomenon that external measurands alter some optical characteristic of the optical fiber sensor, such as its index of refraction or the optical path length for a light signal in the fiber. For most known structures, any axial strain in the cable translates to a concomitant strain in the linear optical fiber, particularly if the fiber is axially oriented, and thus axial cable stress alters the optical path length of the fiber, and spoils any detection scheme.

Various means have been used in the past to reduced the noise conducted to the sensors. Discrete hydrophone elements have been mounted in a foam or a fluid volume to eliminate shear wave stresses, for example. However, when linear optical hydrophones are used, the geometry of the cable for encapsulating the optical hydrophone becomes problematic.

Aside from the mechanical geometry of the cable for retaining a linear optical sensor, a technique for interrogating the sensors must also be included in the streamer system. A structure and a technique for efficient multiplexing in an interferometric sensor array of a large number of sensors was disclosed in parent application U.S. patent application Ser. No. 09/169,252, filed Oct. 9, 1998, and incorporated herein by reference. In a preferred embodiment, the structure defines an apparatus for interferometric sensing comprising an optical source, a tunable filter, a depolarizer for depolarizing optical radiation emitted by the optical source, a matched interferometer, a sensing interferometer, and a detector. The matched interferometer contains a phase modulator and the optical path length difference in the sensing interferometer is approximately equal to the optical path length difference in the matched interferometer. The optical source may be a broad band source or light, or a narrow band source such as a laser.

Thus, the structure disclosed in U.S. patent application Ser. No. 09/169,252 provided wavelength-addressable interferometers containing optical fiber Bragg grating pairs as reflectors. This configuration also dramatically reduced cross-talk between hydrophones, which is inherent in many architectures.

However, there remains a need for a structure whereby the fiber optic acoustic sensors can be incorporated into a seismic array. Such a cable structure should preferably include a linear optical fiber sensor wound around a compliant core or suspended in a spiral tube filled with a fluid. Alternatively, the sensor may include point optical hydrophones. Also alternatively, the linear optical fiber sensor may comprise a spiral structure around a fluid-filled open-cell foam to eliminate common sources of noise.

SUMMARY OF THE INVENTION

The present invention addresses these and other challenges of the prior art in a seismic streamer including an optical fiber as the sensor element. The fiber is wound in a spiral about an axis in a manner to isolate the fiber from axial stresses in the cable. This may be accomplished by placing a fluid layer between the fiber and the source of the stress, or by winding the fiber around a compliant member in a manner to maintain a constant arc length of the fiber.

In a preferred embodiment, the streamer includes four tubes spiraling around a central strength member. One of the tubes encloses an optical fiber sensor which is maintained in an extended orientation by fluid flow through the tube. Another of the tubes serves as a return path for fluid through the sensor tube. The other tubes enclose high speed and low speed data conductors, respectively.

The sensor fiber penetrates the wall of the enclosing tube at a stuffing tube, which also serves as an anchor to retain the sensor fiber. The other end of the sensor fiber is not anchored, but, as previously described, the fiber is kept extended in the tube and substantially not in contact with the wall of the retaining tube by fluid flow through the tube. One sensor fiber is provided for each section of the streamer cable. Each sensor fiber has a plurality of optical fiber Bragg gratings, and each of the plurality of Bragg gratings is tuned to a different wavelength of light.

In another preferred embodiment, a linear optical fiber is wound around a buoyant rubber core, which is enclosed within a liquid filled open cell foam to reduce or eliminate shear stress. A load bearing Vectran stress member encloses the foam/core combination.

In yet another preferred embodiment, a compliant core is selected and then a lay length or pitch of the optical fiber wound around the core is determined. The structure will demonstrate a specific Poisson's Ratio, so that the radial and axial dimensions of the core change with strain in such a manner as to maintain a constant strain on the spiral wound optical fiber.

In still another preferred embodiment, the optical fiber wound around the core includes a plurality of point optical hydrophones.

These and other features of this invention will be apparent to those skilled in the art from a review of the following description along with the accompanying drawings.

BRIEF DESCRIPTION OF THE DRAWINGS

FIG. 1 is a side view of a section of a marine seismic cable.

FIG. 2 is a sectional view of the seismic cable in accordance with this invention.

FIGS. 3A and 3B together are a detailed circuit diagram of the circuit components of the cable of this invention.

DETAILED DESCRIPTION OF PREFERRED EMBODIMENTS

Figure 1A:
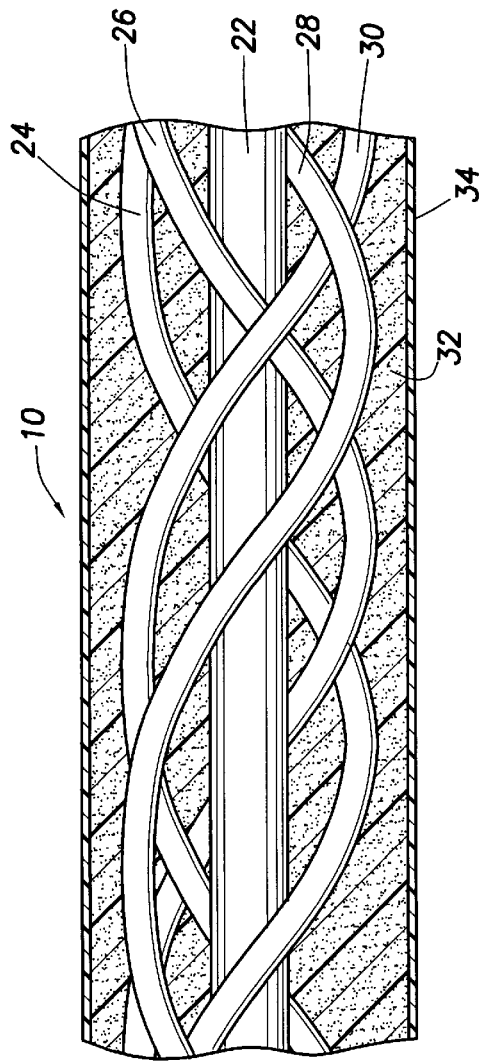
FIG. 1A is a detail section view of the cable.

The common feature of the preferred embodiments described herein is an optical fiber sensor wound in a spiral, or point sensors on a fiber wound in a spiral, to reduce, eliminate, or isolate certain stress attendant in a marine seismic streamer, and its consequent noise.

FIG. 1 depicts a side view of a marine seismic cable 10 constructed in accordance with this invention. The cable 10 is made up of a number of sections, such as section 12, each of which is a length D long, shown also in FIG. 3A, which is preferably about 400 meters. The cable section 12 is joined to a cable section 14 by a coupling 16, and to a section 18 by a coupling 20. Sections are coupled together by couplings to make up the entire streamer, which may be hundreds of meters long. Four of such sections are then jointed together by a module as described below with regard to FIG. 3A.

Sensor Fiber Within a Fluid-Filled Tube

FIG. 1A depicts further details of one embodiment of the cable 12, at detail element 1A of FIG. 1. The cable at this section comprises a single strength member 22, four plastic tubes 24, 26, 28, and 30, all surrounded by a closed cell foam 32, and encased by a jacket or outer sheath 34. Each of the tubes 24–30 is spiral wound around the strength member 22. The tube 24 carries a fiber optic sensor, a feature of this invention; the tube 26 is a continuation of tube 24, and is referred to herein as a return tube, explained below; the tube 28 carries a twisted pair of conductors, for low speed data transmission (for example, for cable leveler and other communications); and the tube 30 carries the fiber optic data transmission lines for high speed seismic data.

The strength member is preferably a single 6 mm diameter Vectran® member, although a number of strength members may be used if desired. The tubes 24 through 30, inclusive, may be made of any appropriate plastic material with a pressure rating of 1 psi per meter of length. Thus, a 400 meter section length would require a plastic material having a pressure rating of 400 psi. This rating is required because components within the tubes will be pumped in and out of the tube by fluid, as described below in greater detail.

FIG. 2 depicts a section view of the cable 10 taken at detail 1A of FIG. 1. As previously described, the tube 24 carries a fiber optic sensor; the return tube 26 is a continuation of tube 24; the tube 28 carries low speed data transmission conductors; and the tube 30 carries the fiber optic data transmission lines for high speed seismic data. Together the closed loop formed by tubes 24 and 26 define a circulator (FIG. 3A). These tubes 24–30 are all extruded into a closed cell foam 32, and encased in a jacket 34.

Figure 1B:
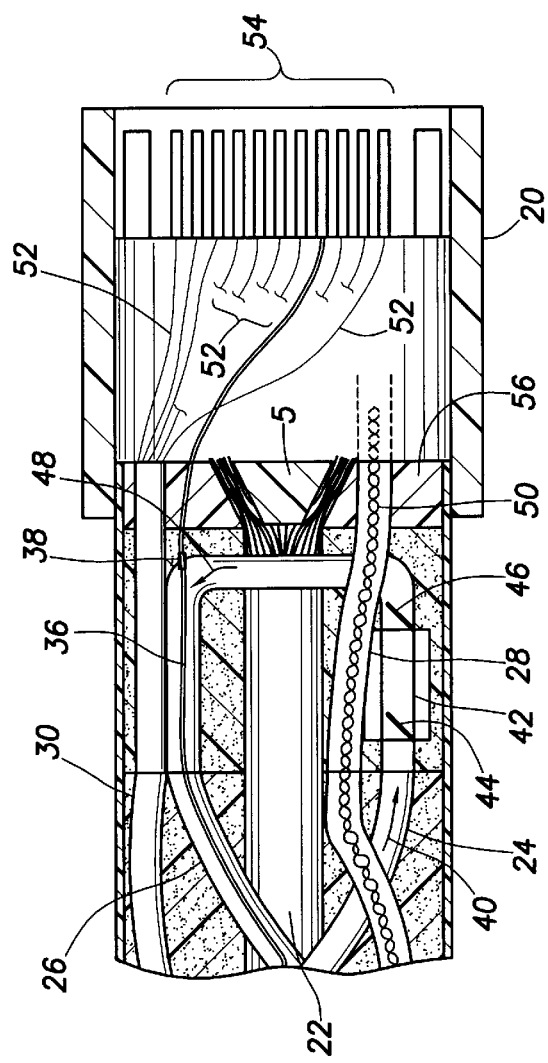
FIG. 1B is a detail section view of the cable at one terminal end.

FIG. 1B provides further details of the cable 10 at the detail element 1B of FIG. 1. This detail shows the terminal end of a cable section 12. As previously described, the tube 24 carries a fiber optic sensor fiber 36, a feature of this invention. The fiber 36 includes characteristics which vary when subjected to a seismic signal, so that, for example, the optical path length of the fiber varies with the pressure signal. The sensor fiber 36 is anchored at a stuffing tube 38 as it penetrates the wall of the tube 26. The fiber 36 is not anchored at its opposite end, and is maintained in its extension down the tube by fluid flow. The fluid within the tube 24 flows in a direction shown by an arrow 40 by a flow means 42, shown schematically as a set of check valves 44 and 46. This flow means is preferably powered by mechanical motion of the cable through the water, but may include an electrically powered pump, or other appropriate means. The fluid continues its flow into the return tube 26 in the direction of an arrow 48 to keep the fiber stretched out through the tube without kinking.

Also as previously described, the tube 28 carries a twisted pair of conductors 50, for low speed data transmission. This data carries command signals to auxiliary equipment exterior to the cable, such as cable levelers and the like, and also provides status data on auxiliary equipment. The conductors 50 are electrically connected to similar conductors in the cable section 18 with a conventional electrical connection in the coupling 20.

The tube 30 carries fiber optic data transmission lines 52 for high speed data seismic data from all the channels aft of the specific associated connector 20. The lines 52 are directed into an optical coupling 54 in a manner well known in the art. The optical coupling connects the optical fibers carrying seismic data into the cable section 18 for transmission ultimately to the host vessel.

The strength member is spliced into a backing plate 56 by feathering the individual Vectran fibers, and potting them in place with a plug 58.

FIGS. 3A and 3B together depict the electronic circuitry for the optical streamer of this invention. FIG. 1 shows that each cable section 12 is a length D, sufficient to enclose one length of fiber sensor 36 (FIG. 1B). As shown in FIG. 3A, a fiber sensor 36 a is a length D, and this optical fiber includes a plurality of pairs of Bragg gratings λ, numbered $\lambda_1$, through $\lambda_{32}$, respectively, in a preferred embodiment; thus the gratings are configured in pairs having substantially the same center wavelength of reflection. Each of the fiber sensors 36a, 36b, 36c, and 36d defines a channel. Further, each of the pairs of Bragg gratings λ is tuned to a specific wavelength of light, such that in the presence of a seismic signal, the behavior of the light within the fiber is altered in a manner that may be subsequently detected. The appropriate interferometer (described below with regard to FIG. 3B) detects changes in the relative optical phase between the light reflected from the first of the pair of Bragg gratings and light reflected from the second of the pair of Bragg gratings, where the optical phase modulation is induced by the action of pressure waves on the fiber between the Bragg gratings and the action of pressure waves on the Bragg gratings themselves. The effect of this modulation is then detected in a host receiver 60 (FIG. 3B).

The system includes a high power source of light 70, which produces light over an optical frequency band both higher and lower than the highest and lowest frequencies to be effective in the fiber sensors 36. The light from the source 70 is split into a plurality of paths in a coupler 72, and only one of the paths is continued in the remainder of the discussion for simplicity. The light from the coupler 72 is conditioned in a conditioner 74, which includes an acousto-optical tunable filter 76, an amplifier 78 and another filter 80. The tunable filter 76 serves also as an optical frequency selector, selecting one of 32 frequencies to match the frequencies of the optical Bragg gratings in the fibers. This feature provides the optical frequency division multiplexing of this invention.

The conditioned light from the conditioner is directed to an isolator 82, which eliminates extraneous signals from reflection back into the conditioner which would interfere with the optical emission action of the light source.

The light from the isolator is further split into four paths in a coupler comprising couplers 84a, 84b, and 84c. The four paths define interferometers 86a, 86b, 86c, and 86d, respectively. Each interferometer comprises an optical frequency shifter, $F_1$, $F_2$, $F_3$, or $F_4$, respectively, in parallel with a polarization scrambler 88a, 88b, 88c, or 88d, respectively. Each of the scramblers is positioned in a fiber of path length L, such as $L_1$, $L_2$, $L_3$, or $L_4$, respectively, to assure maximum stable interference when both paths are rejoined at each output coupler.

The coherence length of the pulse coming out of the source is limited and preferably in the range of 1–20 mm. Thus, the additional path length difference provided by the polarization scrambler paths 88a–88d matches the path length difference in a specific grating pair of gratings at the same frequency, so that only one of the four pairs of gratings in the fibers 36a–36d will respond. This allows the addressing of different grating pairs at the same frequency with different coherence lengths.

The light from the interferometers 86a–86d is coupled together into a single sensor fiber 36 by a coupler 88, and directed into an optical circulator 90. The signal out of the circulator 90 is directed into a fiber 37 which is the point where the fiber leaves the rack mounted shipboard electronics and is directed into the streamer behind the vessel.

The fiber 37 is directed into a module 92, a part of the seismic streamer cable, where a set of couplers 94a, 94b, and 94c split the light and direct the light into the sensor fibers 36a, 36b, 36c, and 36d, as previously described. Light from the sensor fibers, which has now been modulated by the seismic signal, returns to the module 92 and from there to the fiber 39 via the circulator 90.

It should be understood that the architecture depicted in FIGS. 3A and 3B is bi-directional, as shown by a communications line 110. This means that the entire cable can be interrogated from either direction, and the performance of the cable is completely transparent. However, the present invention is equally applicable to other configurations, so that the sensor array may appear different when interrogated from different directions. For example, ocean bottom cables include geophones which output vector rather than scalar information, and thus require unidirectional interrogation.

Also within the module 92 is an inductor coupling 96 powered from the low-speed communication line 50. This coupling 96 provides command and sensing of auxiliary equipment, as previously described.

From the circulator 90, the light is directed to the receiver 60. The receiver 60 includes a detector 100, to convert the light energy to electrical energy. This electrical energy is directed to a set of band-pass filters $F_1$, $F_2$, $F_3$, and $F_4$. Since four pairs of Bragg gratings are being interrogated simultaneously, the filters separate the return signal into modulated signals in predetermined frequency bands. The filters $F_1$, $F_2$, $F_3$, and $F_4$, define the same center frequency as the frequency shifters in the interferometers 86a, 86b, 86c, and 86d. These modulated signals are demodulated in demodulators 102a, 102b, 102c, and 102d, and converted into digital form in A/D converters 104a, 104b, 104c, and 104d. The data from the A/D converters is then recorded, and later reassembled as a seismic image.

Up to this point, the sensor fiber described has been a spiral fiber wound around a strength member and suspended in a fluid filled tube. Other embodiments of the spiral wound fiber are also possible. FIGS. 4A through 5B, inclusive, show an optical fiber hydrophone where the optical fiber sensing interferometer 118 contains two optical fiber Bragg gratings 119 and where the optical fiber 120 is wrapped around a compliant member 122 and bonded. The compliant member 122 may be a polyurethane rod, or syntactic foam containing yarn (such as Kevlar) for strain relief, or other appropriate material. The compliant member 122 is shown with a radius r, and length defined by a y-axis.

Fiber Wrapped Around a Rubber Core

Figure 4A:
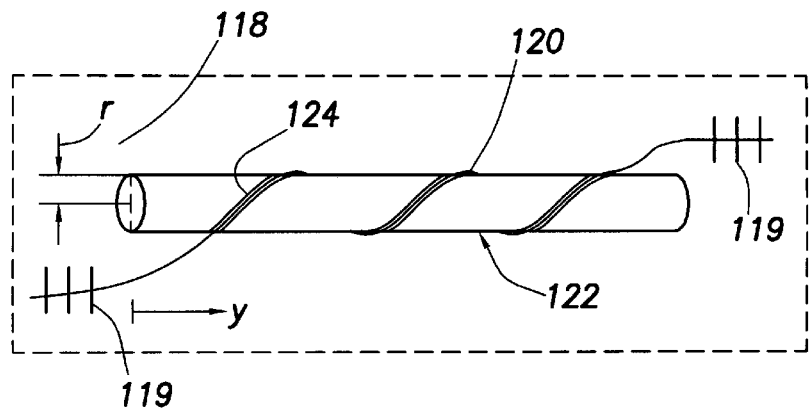
FIG. 4A is a general schematic of a linear optical hydrophone wound around a core.

The structure shown in FIG. 4A uses the same interrogation and multiplexing scheme as shown in FIGS. 3A and 3B, but this structure is directed to a feature to minimize stretch in linear hydrophones by matching Poisson's Ratio of the compliant member 122 to the radius and the lay length. This structure also effectively isolates the sensor from extensional waves, propagating in the compliant member.

The compliant member 122 is preferably a buoyant natural rubber core of radius 10 mm, for example. The fiber (or a pair of fibers in the dual sensor embodiment) is laid in a pre-formed groove 124, spiraling around the compliant member. For a compliant member of 10 mm radius, the lay length is 44.4 mm. The groove is then filled with a potting material that matches the mechanical properties of the core. In another aspect, the fiber may be laid directly on the outer surface of the compliant member and bonded The compliant member is surrounded by a tube of open cell foam 126 with an overall diameter of 30 mm, for example. The assembly is then covered with a tape 128 which encloses the open cell foam. The tape is covered with a multi-fiber Vectran stress member 130 and a polyethylene overbraid 132. The completed assembly is squirted into a polyurethane outer hose 134 and filled with a ballast fluid into the open cell foam 126. The overall diameter of the streamer is preferably less than 40 mm.

The purpose of the liquid fill is to isolate the core 122 from shear waves, coupled in from the stress member 130. Since the core 122, preferably neoprene, is very incompressible, the streamer can be stored under tension on the reel, without risk of damage from the stress member cutting into the core. The core material is carefully selected for its Poisson's Ratio so that the radius of the core is reduced under tension by an amount which exactly cancels the elongation of the core so that the sensor fiber experiences no change in length. The following discussion describes how this feature is derived.

Figure 4B:
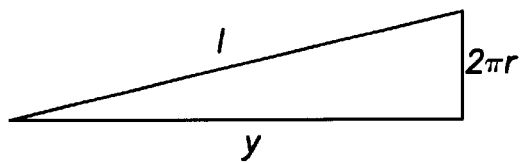
FIG. 4B is a graph showing the relationships of the dimensions of components of FIG. 4A.
Figure 5A:
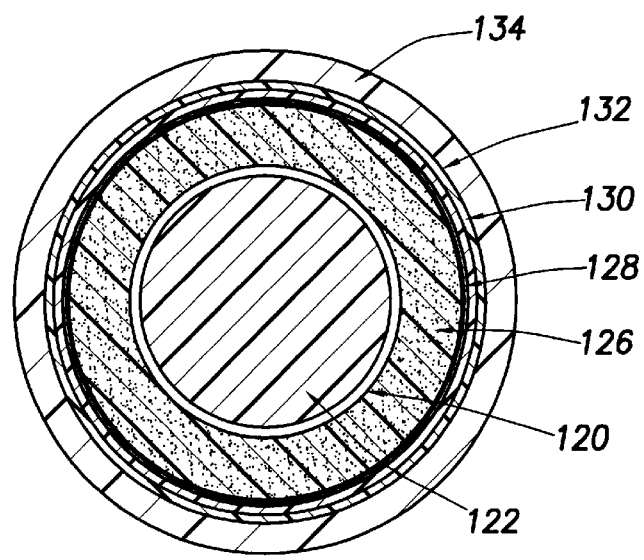
FIG. 5A is an end view of preferred embodiment of an optical cable in accordance with this invention.
Figure 5B:
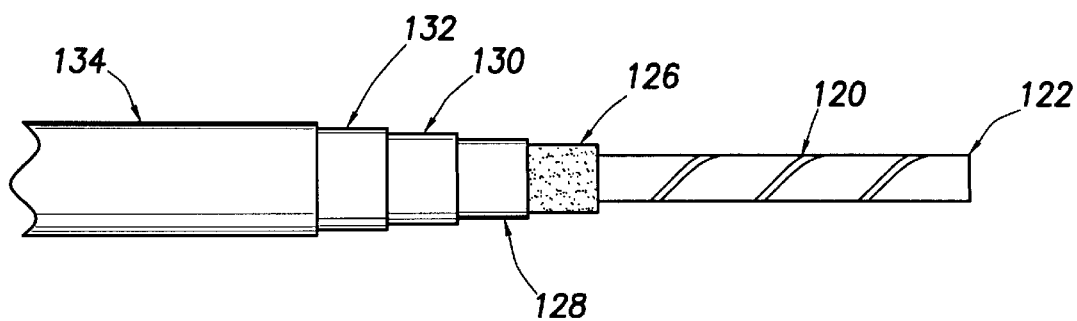
FIG. 5B is a side view of the cable of FIG. 5B illustrating the various layers of construction.

Consider a single spiral around the core 122. As shown in FIG. 4B, let l be the arc length, y the lay length and r the radius of the core. By cutting a hollow cylinder along it length and laying it flat, it is easy to see that these variables are related by the Pythagorean theorem.

$$l^2 = (2\pi r)^2 + y^2.$$

If r and y are changed in such a way that l is kept fixed, then differentiating this equation with respect to y gives $$\frac{dr}{dy} = -\frac{y}{4\pi^2 r}.$$

This is the condition for constant arc length, l.
Poisson's ratio is defined as $$\sigma = -\frac{\frac{dr}{r}}{\frac{dy}{y}} = -\frac{dr}{dy}\frac{y}{r}$$

where dy is the longitudinal change in length and dr is the lateral change. Substituting gives $$\frac{y}{r} = 2\pi\sqrt{\sigma}.$$

If y, r and σ are chosen so that this relation holds, then there will be no first order change in arc length, when the cylinder is extended longitudinally.

For the case of rubber, which has a high bulk modulus, compared to the extensional modulus Poisson's ratio is close to 0.5. This gives $$\frac{y}{r} = 4.44288.$$

Fiber With Point Hydrophones Wrapped Around a Rubber Core

Figure 6A:
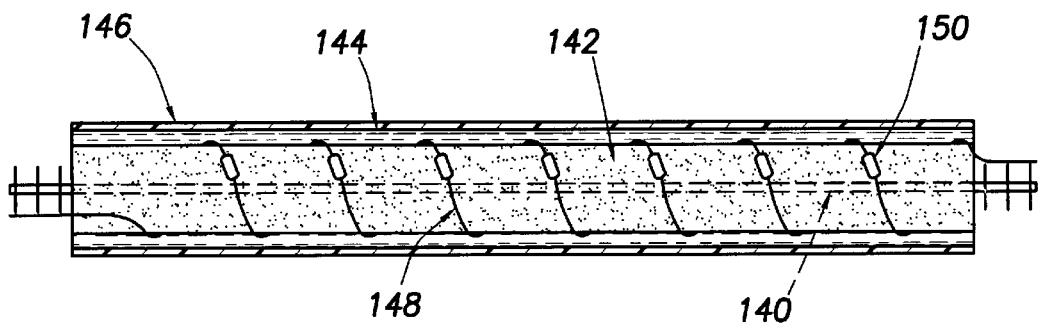
FIG. 6A is a perspective view of an optical streamer cable having point optical hydrophones.

Finally, FIG. 6A depicts another preferred embodiment of the invention. This structure comprises a strength member 140, preferably Kevlar® or Vectran® surrounded by an open-cell foam 142, and an outer foam wrap 144, and enclosed by an oil-filled polyurethane tube 146. An optical fiber 148 is wound in a spiral around the open-cell foam 142, and in this embodiment the fiber includes a plurality of point sensors 150. The point sensors are preferably made as part of the fiber 148 without cutting the fiber.

In this embodiment, the open-cell foam 142 is fluid-filled, which isolates shear waves from the strength member 140. The open-cell foam may also be carefully selected to demonstrate the constant arc length feature of the embodiment of FIGS. 4A–5B.

Figure 6B:
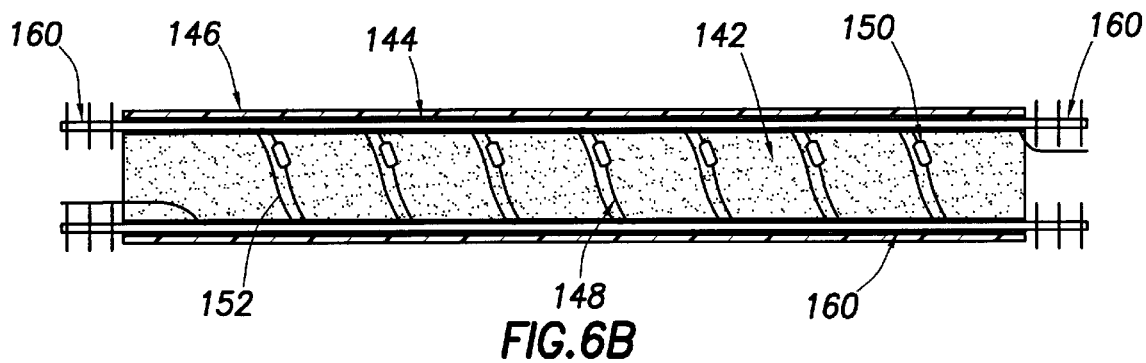
FIG. 6B is a perspective view of an optical streamer cable with a linear hydrophone side by side with point optical hydrophones, and further having a pair of strength members running axially with the axis of the cable.

FIG. 6B depicts yet another preferred embodiment of the invention. This structure comprises a pair of strength members 160, preferably Kevlar® or Vectran® outside the open-cell foam 142, and the outer foam wrap 144. As with the embodiment of FIG. 6A, the outer foam wrap is enclosed by an oil-filled polyurethane tube 146.

An optical fiber 148, including the plurality of point sensors 150, is wound in a spiral around the open-cell foam 142, and in this embodiment the fiber includes a plurality of point sensors 150. These point sensors may be made by winding the fiber around a compliant member that is compressed by an acoustic signal during operation. There is also included a linear optical hydrophone 152 laid side by side with the fiber 148, for noise elimination as previously described. As in the embodiment of FIG. 6A, the open-cell foam 142 is fluid-filled, which isolates shear waves from the strength member 140. The open-cell foam may also be carefully selected to demonstrate the constant arc length feature of the embodiment of FIGS. 4A–5B.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A structure for retaining a fiber optic acoustic sensor in a seismic array, the structure comprising:
   a. a compliant core;
   b. a fiber optic acoustic sensor wound in a spiral around the compliant core, the sensor having a plurality of optical Bragg gratings and a plurality of channels; and
   c. a strength member to carry the mechanical load of the seismic array in parallel with the core.

2. The sensor of claim 1, wherein the plurality of optical Bragg gratings are configured in pairs having substantially the same center wavelength of reflection.

3. The structure of claim 1, wherein the sensor is enclosed in a sensor tube wound in a spiral.

4. The structure of claim 1, wherein the sensor is enclosed in a sensor tube wound in a spiral around the strength member.

5. The structure of claim 3, further comprising means for anchoring an end of the optical sensor in the sensor tube.

6. The structure of claim 5, further comprising means for developing fluid flow through the sensor tube to maintain the fiber in an extended orientation.

7. The structure of claim 5, further comprising a first communications tube for retaining a low speed data communications channel and a second communications tube for retaining a high speed data communications channel.

8. The structure of claim 7, wherein all of the tubes are spiral wound around the strength member.

9. The structure of claim 4, further comprising a foam surrounding the strength member and the tube.

10. The structure of claim 9, further comprising a jacket enclosing the foam.

11. The structure of claim 9, wherein the foam is a closed cell foam.

12. The structure of claim 1, wherein the structure comprises a section of a seismic streamer, and further comprising a coupling to join the section to an adjacent section.

13. The structure of claim 12, wherein the coupling includes a backing plate, and wherein the strength member is spliced to the backing plate.

14. The structure of claim 1, wherein each of the plurality of Bragg gratings defines a sensing interferometer addressable by a unique optical wavelength.

15. The structure of claim 14, further comprising a broad band light source to introduce a light signal into the optical sensor.

16. The structure of claim 15, further comprising a receiver to receive light from the optical sensor.

17. The structure of claim 15, further comprising a plurality of sensor interferometers between the source and the optical sensor, wherein each of the plurality of sensor interferometers defines a different frequency.

18. The structure of claim 17, wherein each of the plurality of sensor interferometers comprises a frequency shifter in parallel with a polarization scrambler.

19. The structure of claim 15, further comprising:
a. a plurality of optical sensors; and
b. a module including a plurality of optical couplers to split the light signal to direct the light signal into the plurality of optical sensors.

20. The structure of claim 19, further comprising an inductive coupling within the module to sense the condition of equipment external to the streamer and to couple commands to the equipment.

21. The structure of claim 1, further comprising a plurality of strength members.

22. The structure of claim 1, wherein the sensor comprises a linear optical hydrophone and further comprising an optical fiber including a plurality of point optical hydrophones in parallel side by side arrangement with the linear optical hydrophone.

23. The structure of claim 1, where in the sensor includes a plurality of point optical hydrophones.

24. A method of method of mounting a fiber optic acoustic sensor in a seismic array, comprising the steps of:
a. spiraling a sensor tube around a central strength member, the sensor tube configured to contain an optical sensor;
b. inserting a fiber optic acoustic sensor into the sensor tube; and
c. anchoring an end of the sensor within the sensor tube.

25. A structure for retaining a fiber optic acoustic sensor in a seismic array, the structure comprising:
a. a compliant core; and
b. a fiber optic acoustic sensor wound in a spiral around the compliant core;
c. wherein the compliant core is made of a material that substantially satisfies the relationship $$\frac{y}{r} = 2\pi\sqrt{\sigma},$$

where y defines the length of the core, r defines the radius of the core, and $\sigma$ is the Poisson's ratio of the core.

26. The structure of claim 25, further comprising a plurality of point hydrophones along the fiber optic acoustic sensor.

27. The structure of claim 25, further comprising an open-cell foam enclosing the core and the sensor.

28. The structure of claim 27, further comprising a substantially cylindrical strength member enclosing the open-cell foam.

29. The structure of claim 28, further comprising an overbraid enclosing the strength member and a jacket enclosing the overbraid.

30. An axially oriented sensor in a seismic array, the sensor comprising a pressure sensitive optical fiber wound in a spiral around the axis, the fiber having a plurality of optical Bragg gratings and a plurality of channels.

31. The sensor of claim 30, further comprising a parallel sensor laid side by side with the sensor.

32. The sensor of claim 31, wherein the parallel sensor includes a plurality of point hydrophones.

* * * * *